Patented Dec. 1, 1925.

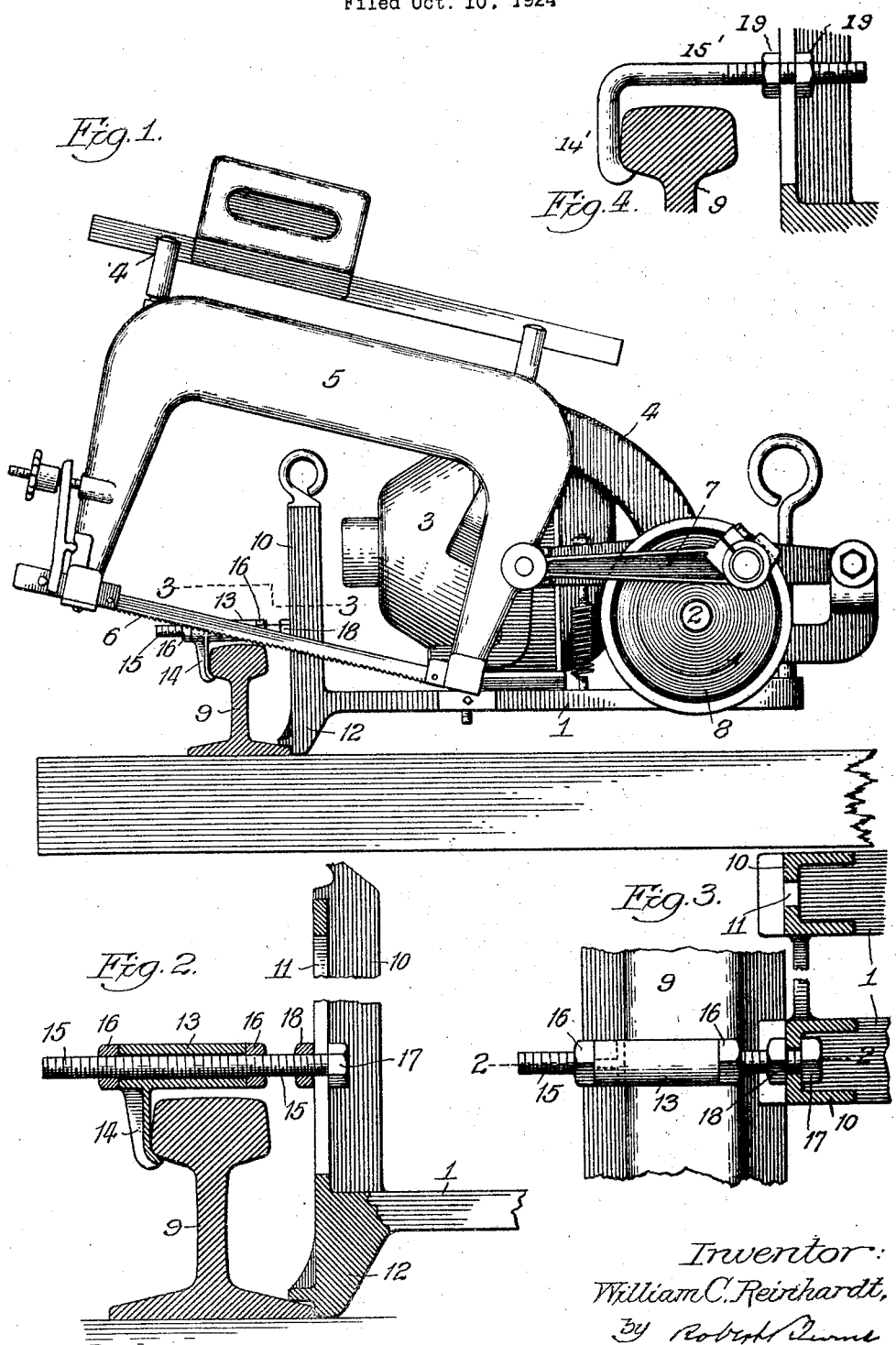

1,564,114

UNITED STATES PATENT OFFICE.

WILLIAM C. REINHARDT, OF RACINE, WISCONSIN, ASSIGNOR TO RACINE TOOL & MACHINE COMPANY, OF RACINE, WISCONSIN, A CORPORATION OF WISCONSIN.

PORTABLE RAIL-SAWING MACHINE.

Application filed October 10, 1924. Serial No. 742,310.

*To all whom it may concern:*

Be it known that I, WILLIAM C. REINHARDT, a citizen of the United States of America, residing at Racine, in the county of Racine and State of Wisconsin, have invented certain new and useful Improvements in Portable Rail-Sawing Machines, of which the following is a specification.

This invention relates to the class of metal sawing machines of the cross cut type in which the saw carrying frame reciprocates in an approximately horizontal direction and has a swinging movement in a vertical direction to attain the proper feed or cut of the saw in the continued operation of the machine, and more particularly to the portable type of such machines used for sawing track rails in situ.

The main object of the present improvements is to provide a structural formation and combination of parts and elements whereby the supporting frame of a metal sawing machine is attached to and wholly supported by the track rail operated on in a firm and substantial manner, and by means of which ready attachment and detachment of the machine from the work is attained as may be required in the operation of sawing rails in situ.

An additional object is to provide means whereby a convenient and effective tilting adjustment of the entire machine in a vertical plane is attained with a view to change the direction of the path in which the saw reciprocates, and in which the cutting operation of the same is effected, all as will hereinafter more fully appear.

In the accompanying drawing:

Fig. 1 is side elevation of a metal sawing machine having the present invention applied.

Fig. 2 is a detail vertical section on line 2—2 Fig. 3.

Fig. 3 is a detail horizontal section on line 3—3 Fig. 1.

Fig. 4 is a companion view to Fig. 2, illustrating a modified construction.

Like reference numbers indicate like parts in the different views.

The metal sawing machine shown in Fig. 1 is old in its general features, and briefly comprises a main carrying frame 1 provided with bearings for the crank shaft 2 of the mechanism, a motor 3 mounted on said frame and operatively connected to said crank shaft, and a swinging guide frame 4 pivotally mounted on the shaft 2, and provided with a guideway for a yoke frame 5 in which the saw blade 6 is secured, said yoke frame having a reciprocating movement in an approximately horizontal path derived through a pitman 7 intermediate of the yoke frame and the wrist pin of a crank disk 8 on the shaft 2, aforesaid.

The present improvements relate wholly to means for attaching the frame 1 of a sawing machine of the type above described to a railway rail or like piece of structural metal to be severed. In this the frame 1 at an end adjacent to the rail 9 to be operated on, is provided with one or more posts 10 the upper portions of which are formed with vertical slots 11 for the attachment, in an adjustable manner, of the shank portions of the rail head engaging claw members hereinafter described. In the present construction the lower end 12 of each post 10, which is preferably integral with frame 1, projects below the main frame 1 and is formed with a notch or recess so as to fit and have bearing abutment upon the lower flange or web of the railway rail 9 as shown.

The rail head engaging claw members above referred to, in the preferred form of the invention shown in Figs. 1, 2, and 3, will each comprise a tubular body member 13 having a depending lateral claw 14 formed to engage the head of the rail 9 at a side of the rail opposite to the side at which the notched lower end 12 of the post 10 has bearing, and a screw threaded rod member 15 encircled by the said body member 13, with the adjustment of said body member 13 along the rod member 15, effected by nuts 16 as shown. In such construction the screw threaded rod member 15 is provided with a fixed head 17 at its end remote from the claw 14 aforesaid, for abutment against the margins of the vertical slot 11 of a post 10, and with the parts held to a desired vertical adjustment on said post by an adjustable clamping nut 18.

In a simplified form of the invention illustrated in Fig. 4, one end of the rod member 15′ is bent to form a hook shape claw 14′, while the main portion of the rod member is screw threaded and is provided with nuts 19 which bear against opposite sides of the vertically slotted post 10 to afford means for the longitudinal and the vertical adjustment of the rod member 15′ in the different uses of the machine.

With the arrangement and formation of parts above described, the rail head engaging claw 14, or 14′ is capable of adjustment independent of the other rail engaging parts, to attain a pivotal adjustment of the entire machine in a vertical plane, with the notched lower end of a post 10 and the bottom flange of the railway rail 9 providing a fulcrum in such pivotal movement. So that the saw blade 6 may have a reciprocating movement in a horizontal plane or in a plane oblique thereto, as may be found most desirable in a continued use of the machine.

Having thus fully described my invention, what I claim and desire to secure by Letters Patent, is:—

1. In a portable sawing machine of the class described, the combination of a main frame having one of its lower corners formed for bearing engagement with the bottom flange of a railway or like rail so as to position the frame wholly to one side of said rail, a vertically movable and horizontally reciprocating saw blade with its carrying and operating mechanism mounted on said frame, an upright guide post fixed on said frame, and a claw member formed for engagement with a top flange of the aforesaid rail and attached to the upright post in a vertically and a horizontally adjustable manner, the weight of the main frame and mechanism mounted thereon tending to cant and bind the aforesaid means of attachment upon the rail.

2. In a portable sawing machine of the class described, the combination of a main frame having one of its lower corners formed for bearing engagement with the bottom flange of a railway or like rail so as to position the frame wholly to one side of said rail, a vertically movable and horizontally reciprocating saw blade with its carrying and operating mechanism mounted on said frame, a vertically slotted guide post fixed on said frame, a claw member formed for engagement with a top flange of the aforesaid rail and having a screw threaded shank passing through the vertical slot of the post aforesaid, and nuts on said shank for securing the same in a vertically adjustable manner in said post, the weight of the main frame and mechanism mounted thereon tending to cant and bind the aforesaid means of attachment upon the rail.

3. In a portable sawing machine of the class described, the combination of a main frame having a lower edge formed for bearing engagement with the base flange of a railway or like rail, a vertically movable and horizontally reciprocating saw blade with its carrying and operating mechanism mounted on said frame, an upright guide post fixed on said frame, a claw member having a tubular body portion and a lateral lug formed for engagement with a top flange of the aforesaid rail, a carrier rod fitting the bore of the body portion of the claw member and having a screw threaded periphery, adjusting nuts on said carrier rod for effecting an adjustment thereon of the claw member, and means for attaching said carrier rod in a vertically adjustable manner to the guide post aforesaid, the weight of the main frame and mechanism mounted thereon tending to cant and bind the aforesaid means of attachment upon the rail.

Signed at Racine, Wisconsin, this 27th day of September, 1924.

WILLIAM C. REINHARDT.